United States Patent [19]
Chisdes et al.

[11] 3,916,300
[45] Oct. 28, 1975

[54] THERMALLY COMPENSATED FLOW-THROUGH TYPE ELECTROLYTIC CONDUCTIVITY CELL

[75] Inventors: David M. Chisdes, Wayne; Elmer A. Sperry, III, Pompton Plains, both of N.J.

[73] Assignee: Beckman Instruments, Inc., Fullerton, Calif.

[22] Filed: Feb. 11, 1974

[21] Appl. No.: 441,046

[52] U.S. Cl. .................................. 324/30 B
[51] Int. Cl.² ................................ G01N 27/42
[58] Field of Search ............. 324/30 R, 30 B, 65 R

[56] References Cited
UNITED STATES PATENTS

| | | | |
|---|---|---|---|
| 2,258,045 | 10/1941 | Christie | 324/30 R |
| 2,533,462 | 12/1950 | Ingram | 324/30 |
| 2,560,209 | 7/1951 | Borell | 324/30 R |
| 2,654,862 | 10/1953 | Petersen | 324/30 R |
| 2,873,236 | 2/1959 | Ferris | 324/30 B |
| 3,365,659 | 1/1968 | Breuer | 324/30 |
| 3,559,048 | 1/1971 | Bryant | 324/30 B |

Primary Examiner—Alfred E. Smith
Assistant Examiner—Rolf Hille
Attorney, Agent, or Firm—R. J. Steinmeyer; P. R. Harder

[57] ABSTRACT

A flow-through type conductivity cell is provided having concentric electrodes between which all of the fluid flows so as to obtain quick response to changes in fluid composition by avoiding the presence of stagnant pockets of fluid. A temperature sensor is mounted at the center of the inner electrode so as to be surrounded by the electrolyte and thereby more closely responsive to the actual temperature of the electrolyte flowing through the cell.

3 Claims, 3 Drawing Figures

THERMALLY COMPENSATED FLOW-THROUGH TYPE ELECTROLYTIC CONDUCTIVITY CELL

BACKGROUND OF THE INVENTION

Flow-through type conductivity cells have been proposed with flat, cylindrical or concentric electrodes and temperature compensation has been proposed by inserting temperature sensors in the stream of flowing liquid, the conductivity of which is to be measured, either in advance of the cell or following the cell. The mounting of sensors on the outside of the cell has also been proposed. However, difficulty has been encountered in obtaining a response to the actual temperature of the body of liquid between the electrodes in order to obtain accurate temperature compensation. Temperature sensors on the outside of the cell or mounted in wells projecting into the cell tend to be influenced more by ambient temperature than the actual temperature of the electrolyte between the electrodes and temperature variations tend to take place in the stream of liquid so that the measurement of the temperature before or after the liquid flows through the cell also presents difficulties in obtaining accurate temperature compensation.

Flow-through cells have also been proposed in which two or more annular electrodes are provided which are axially spaced along the stream of flow of the liquid. With this construction, however, it is difficult to obtain a cell of practical size where it is desired to have a small cell constant.

It is an object of the invention to obtain accurate temperature compensation of conductivity cells, to obtain response quickly to variations in composition of the liquid being measured and to avoid stagnant pockets of liquid.

Other and further objects, features and advantages of the invention will become apparent as the description proceeds.

SUMMARY OF THE INVENTION

In carrying out the invention in accordance with a preferred form thereof a conductivity cell is provided in which there is an annular passageway for the flow of all the liquid the conductivity of which is to be measured and hollow cylindrical electrodes are provided between which all of the liquid must flow, one of the electrodes being mounted at the inner wall of the concentric passageway and the other being mounted concentrically therewith in the outer wall of the concentric passageway. A temperature sensor is mounted centrally of the inner electrode within the inner wall of the concentric passageway so that the sensor is not actually within the liquid but entirely surrounded thereby. Consequently, it responds to the temperature of the liquid flowing between the electrodes and is relatively unaffected by the ambient temperature.

A better understanding of the invention will be afforded by the following detailed description considered in conjunction with the accompanying drawing.

DRAWINGS

In the drawing.

Like reference characters are utilized throughout the drawing to designate like parts.

DETAILED DESCRIPTION

Figure 1:
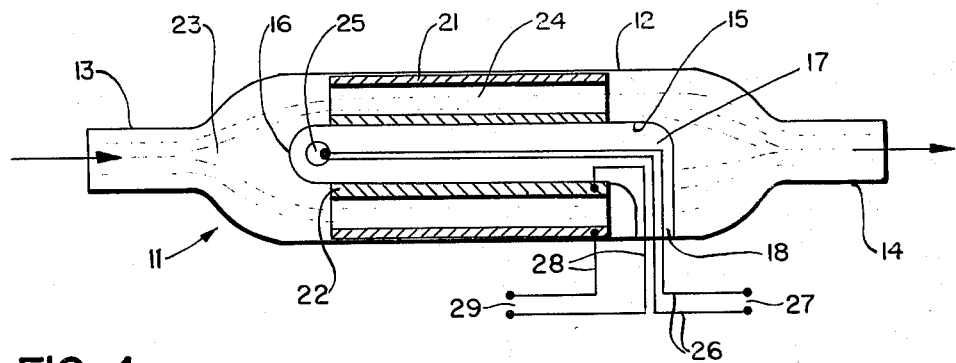
FIG. 1 is a schematic line diagram representing a longitudinal section of an embodiment of the invention in which the cell walls are composed of glass.

In the embodiment of the invention illustrated in FIG. 1 there is an enclosure of electrically insulating material, e.g. a glass envelope 11 having a cylindrical outer wall 12 with a reduced diameter inlet 13 for connection to in-flow tubing and a reduced diameter outlet 14 for connection to out-flow tubing. Within the cylindrical outer wall 12 there is an insert 15 also composed of insulating material which may be glass in the particular embodiment illustrated to form a space from which fluid flowing through the inlet 13 and outlet 14 is excluded. The insert 15 may also have a substantially cylindrical wall with a closed end 16 and an elbow 17 at the opposite end with an open mouth 18 joined to an opening of corresponding size in the cylindrical wall 12 of the member 11. It will be understood that this may be accomplished by flame melting and fusing the edges to be joined. The operation may be facilitated by carrying it out before the inlet 13 and outlet 14 have been drawn to the reduced diameter shown, from glass tubing originally of the diameter of the outer wall 12 by conventional flame softening of the portions to be drawn and reduced in diameter.

Before the insert 15 is mounted and the ends 13 and 14 have been drawn to reduced size, concentric hollow cylindrical electrodes 21 and 22 are mounted. As shown, the outer electrode 21 is mounted within the cylindrical wall 12 and the inner electrode 22 is mounted upon the insert 15.

For obtaining an indication of the temperature of fluid 23 flowing through the annular passageway 24 and actuating a suitable temperature compensation circuit, a temperature sensor 25 is mounted in the interior of the insert 15. The construction provides a passageway in which conductors 26 leading from the temperature sensor 25 may be provided for connection to terminals 27 of a temperature compensation circuit. Conductors 28 are also provided which are connected each at one end to one of the electrodes 21 and 22 and at the other end to terminals 29 for connection to conductivity measurement circuitry. It will be understood that suitable openings (not shown) are pierced in the walls of the members 11 and 15 which receive the conductors 28 and are fused thereto to provide fluid-tight joints.

The temperature sensor 25 may be of any desired type, such as a thermal junction, thermistor, or a calibrated temperature-responsive resistor. For clarity in the drawing the opening 18 is shown as providing relatively large space surrounding the conductors 26 and 28. In practice, however, suitable electrical insulating material is inserted around the conductors to close the space 18 to the atmosphere so that the temperature of the interior of the insert 15 is unaffected by ambient temperature and depends upon the temperature of the surrounding fluid flowing through the annular passageway 24. In this manner the temperature to which the sensor 25 responds represents the temperature of the fluid 23 arriving from the inlet 13 so that it responds quickly to any changes in temperature of incoming fluid.

Figure 2:
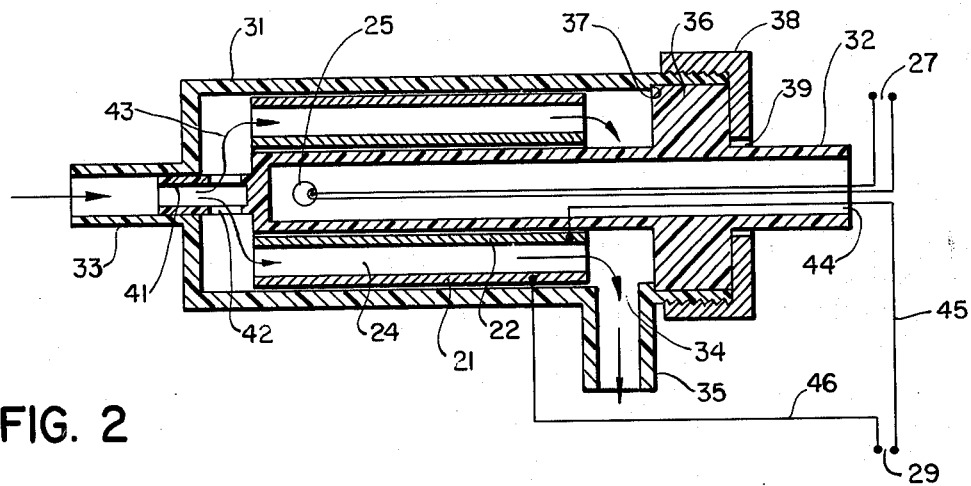
FIG. 2 is a schematic diagram of a longitudinal section of another embodiment of the invention in which the cell walls may be composed of or covered with electrically insulating material assembled from parts to form a completed structure.

In FIG. 1 an embodiment has been illustrated which may be formed from glass tubing by flame softening and forming techniques. However, the invention is not limited thereto and apparatus in accordance with the invention may also be fabricated or assembled from separate elements composed of or covered with electrically insulating material. For example, as illustrated in FIG. 2, there may be an outer member 31 molded or otherwise formed from ceramic, plastic polymer or other suitable electrically insulating material and a concentric inner member 32 also composed of suitable electrically insulating material. Preferably, although not necessarily, the members 31 and 32 are formed with circular cross sections. As shown, the member 31 has a tubular neck portion 33 to form a fluid inlet and a lateral opening 34 near the end opposite the inlet 33 at which a tubular fluid outlet 35 is formed.

The inner member 32 is generally tubular in form but it is provided with a collar portion 36 near the end away from the fluid inlet 33 in order to fit within the corresponding end of the outer member 31. In order that a good seal may be formed at the joint between the collar 36 and the outer member 31, the latter is preferably counter-bored to form a shoulder 37 against which the collar 36 may fit. It will be understood that a suitable resilient sealing ring (not shown) may be provided at the junction with the shoulder 37, although this would not be necessary if the member 32 is formed of a material having some degree of resiliency. For the purpose of securing the collar 36 in the counter-bore of the member 31 and sealing the junction an internally threaded cap 38 is provided having an opening 39 surrounding the end portion of the tubular member 32.

As in the case of the embodiment of FIG. 1, outer and inner hollow cylindrical concentric electrodes 21 and 22 are provided between which an annular passageway 24 is provided for the flow from the inlet 33 to the outlet 35 of fluid, the conductivity of which is to be measured. The outer electrode 21 is secured by suitable means to the interior surface of the outer tubular member 31 and the electrode 22 is likewise secured to the outer surface of the inner tubular member 32.

Preferably, the inner tubular member 32 is formed with a hollow, smaller diameter extension 41 fitting within the tubular inlet 33 of the outer member 31. The tubular extension 41 is formed with lateral or peripheral openings 42 to provide radial fluid flow paths 43 from the inlet 33 to the annular fluid passageway 24. The hollow extension 41 serves to provide greater structural strength and rigidity to the assembly as well as facilitating the guiding of the inner member 32 into place in the outer member 31 when the parts are assembled. The extension 41 also serves to provide greater accuracy in the concentricity of the inner and outer electrodes 21 and 22 and the maintenance of the spacing of the electrodes so that accuracy of calibration of the unit as a conductivity measurement device is retained.

In using the cell illustrated in FIG. 2 of the drawings, the inlet tube 33 is connected to tubing from which the fluid to be measured is received and the outlet tube 35 is connected to tubing to which the fluid is to be delivered. The terminals 29 are connected to conventional circuitry for measuring the conductivity of the fluid between the electrodes 21 and 22 and the terminals 27 are connected to suitable temperature compensation circuitry for adjusting the measurement otherwise provided by the circuit to which the terminals 29 are connected.

The embodiment of FIG. 2 has the advantage from the manufacturing standpoint that the temperature sensor 25 may be mounted in place and the conductors 26 may be brought out through the end opening 44 in the inner member 32 and the member 32 may be secured in place within the outer member 31 by the relatively simple operation of securing and tightening the cap 38. The inner electrode 22 may also be mounted upon the member 32, and the conductor 45 for the electrode 22 may also be readily connected to the electrode 22 before the device is assembled. In like manner the electrode 21 may be mounted in place and connected to the conductor 46 prior to the cell assembly by simpler techniques than piercing a glass wall and fusing the conductor thereto. Alternatively, the surfaces of members 31 and 32 may be covered with a conductive coating which forms the electrodes 21 and 22.

In the assembled structure of FIG. 2 the tubular members 31 and 32 have been illustrated as being composed of insulating material with conductive electrodes 21 and 22 each mounted or coated on an insulating member. However, the invention is not limited thereto and does not exclude the use of tubular members composed of metal or other conductor but insulated from each other, from return electrical circuits and in some cases from supporting structure by suitably placed insulators or by insulating films, sheets or coatings on confronting or adjacent surfaces and by insulating means for the sensor 25, and conductors 26, 45 and 46.

Although the electrodes 21 and 22 have been shown as separate elements, this is not necessary as either or both members 31 and 32 may serve as an electrode if it is composed of electrically conductive material and suitably insulated from the other member. Alternatively, the member which is to serve as an electrode or both of them may be composed of electrically conductive material coated with insulating material except along the surface corresponding to the location of the electrode 21 or 22, or both of them.

In FIG. 2 the inlet 33 has been shown as axial and the outlet 35 has been shown as radial. However, the direction of flow may be reversed. Moreover, the construction may be modified to provide radial connections for both inflow and outflow, provided all of the fluid 23 flows between the electrodes 21 and 22. For example, as illustrated in FIG. 3, radial connecting tubes similar to the outlet 35 may be provided near opposite ends of the outer member 31, eliminating the axial inlet 33.

The assembled construction of FIG. 2 may readily be disassembled for inspection and cleaning and reassembled and adjusted without changing the cell constant.

Figure 3:
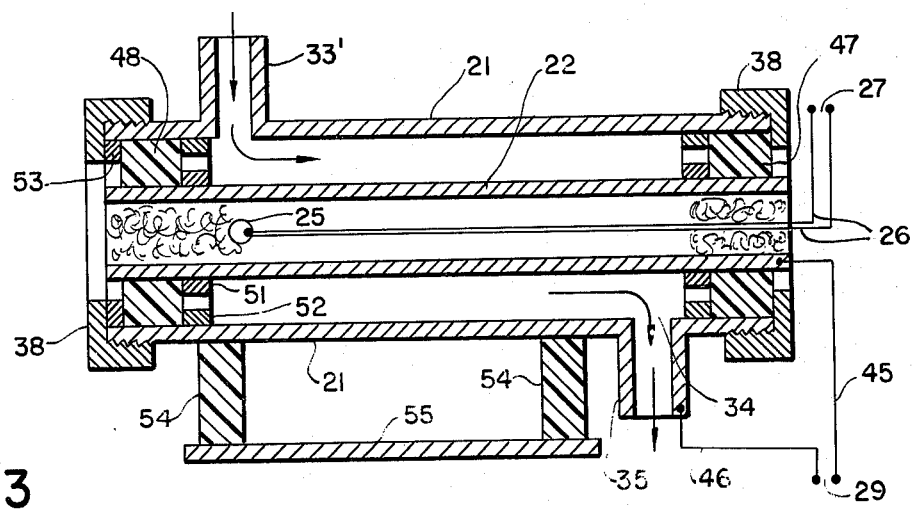
FIG. 3 is a diagram of another embodiment of the invention.

As illustrated in FIG. 3, the outer electrode 21 may form the outer tube, being composed of metal or other electrically conductive material or constitute an inner surface of electrically conductive material in a tube. Likewise, the inner electrode 22 may constitute the insert or constitute an outer surface of electrically conductive material on an insert. In the arrangement of FIG. 3 where the electrodes 21 and 22 constitute the outer tube and the insert respectively, they are insulated from each other by suitable means such as insulating bushings 47 and 48. For reproducibly locating the inner electrode 22 within the outer electrode 21 they are formed at one end at least with abutments 51 and 52, respectively, integral therewith or otherwise secured thereto as by welding, against which the insulating bushing 48 may be secured by the hollow screw 38.

In order that adjustments in the axial location of the insert or the inner electrode 22 may be made with respect to the outer tube or the outer electrode 21, one or more annular shims 53 are provided which may be positioned either between the hollow screw 38 and the bushing 48 or between the bushing 48 and the abutment 52 according to the desired position of the inner electrode with respect to the outer. The bushing 48 or the shims 53 are composed of resilient gasketing material in order to form a fluid tight seal as well as adjustable means for securing the insert within the outer tube. Similar sealing and adjusting means are provided at the opposite end of the members 21 and 22.

In the event that the outer surface of the outer electrode 21 is not insulated, suitable insulating means are provided to guard against grounding the electrical circuit of the measurement system connected to the terminals 29. For example, a cradle composed of insulating material 54 mounted on a base 55 may be provided.

Specific arrangements and structural relationships have been illustrated and described by way of example, but it will be understood that the invention is not limited to the embodiments illustrated and various modifications will suggest themselves to those skilled in the art without departing from the spirit and scope of the invention.

What is claimed is:

1. A conductivity cell comprising:

inner and outer electrode means, one surrounding the other;

a fluid conduit means for directing all of the fluid, the conductivity of which is to be measured, in a hollow path between said electrodes, said fluid conduit means having a fluid inlet and a fluid outlet;

a temperature sensor at a position surrounded by the hollow path of fluid so as to be responsive to the temperature of said fluid while in said hollow path;

a hollow insert of electrically insulating material mounted within said fluid conduit means and surrounding said temperature sensor thereby to electrically insulate said temperature sensor from said fluid;

said insert having an end closed to access of fluid passing between the electrodes and provided with a projecting means on said closed end;

said projecting means fitting into the inlet of said fluid conduit means to position the insert in said fluid conduit means and having passageways for fluid from the inlet to the space between said electrodes.

2. The conductivity cell as defined in claim 1 wherein said outer electrode means is an electrically conductive material forming at least a portion of said fluid conduit means.

3. The conductivity cell as defined in claim 1 wherein said outer electrode is mounted on the inner surface of said fluid conduit means and said inner electrode means is mounted on the outer surface of said insert.

* * * * *